Patented Aug. 28, 1945

2,383,660

UNITED STATES PATENT OFFICE 2,383,660

METHOD OF TRANSPARENTIZING PAPER

Julius G. Little, Wilmington, Del., assignor to Hercules Powder Company, Wilmington, Del., a corporation of Delaware No Drawing. Application September 25, 1942, Serial No. 459,716

1 Claim. (Cl. 117—158)

This invention relates to transparentized paper and the method for its production. More particularly, it is concerned with an improved transparentized paper containing a hydrogenated rosin ester and method for its production.

There are many known methods of transparentizing paper. Each method, however, possesses inherent disadvantages which have not been overcome. For example, papers transparentized with vegetable and mineral oils and sizes alone or with combinations of these ingredients are characterized by poor ink receptivity, poor pencil erasive qualities, possess a greasy feel, and have a tendency to yellow and acquire a disagreeable odor over extended aging periods. Papers transparentized with synthetic resins of the oil modified alkyd type also possess a disagreeable odor and discolor on aging.

Now, in accordance with this invention, a transparentized paper may be prepared by impregnating the paper with a glycol ester of hydrogenated rosin. The transparentized paper thus obtained is characterized by excellent transparency, non-yellowing on age, good pencil and ink receptivity, lack of odor, and stability of properties of stiffness due to resistance to oxidation.

Having now indicated in a general way, the nature and purpose of my invention, the following examples are offered to give specific illustrations of the practice of the invention and the advantages to be obtained by their use thereof and are not to be construed as limiting the same. In the examples, the ingredients are given in parts by weight unless otherwise indicated.

Example 1

A triethylene glycol ester of hydrogenated rosin, prepared by mixing 100 parts of hydrogenated rosin with 27 parts of triethylene glycol in a vessel equipped with a steam condenser and carbon dioxide inlet and heating to a temperature of 280° C. until the acid number of the ester thus formed had decreased to below 15, was dissolved to 37.5 solids in ethyl acetate. Rag stock (13 lbs./ream) was transparentized with this resin solution by immersing the paper in this solution. The excess resin solution was removed by means of squeeze rolls and the transparentized stock allowed to air dry. This transparentized paper possessed a transparency index of 54.0% as measured by the General Electric Spectrophotometer.

Example 2

To 100 parts of the glycerol ester of hydrogenated rosin having a color of 25 Amber, a melting point of 85° C., and an acid number of 7, prepared by reacting 100 parts hydrogenated rosin with 11 parts glycerine at a temperature of 285° C., in apparatus described in Example 1, were added 100 parts of triethylene glycol ester of hydrogenated rosin and the whole dissolved into 100% solids. Rag stock (13 lbs./ream) was transparentized with this resin by immersing the paper in the resin solution, removing excess solvent by means of squeeze rolls and allowing the paper to air dry. The transparentized paper thus produced was equal in transparency to Example 1 (transparency index of 54.0%) but possessed increased stiffness and "snap."

Example 3

The hexaethylene glycol ester of hydrogenated rosin, prepared by the same procedure used in Example 1 using 100 parts of hydrogenated rosin and 50 parts of hexaethylene glycol, was heated to 100° C. Rag stock (13 lbs./ream) was passed through the molten rosin ester and excess removed by passing the impregnated paper through squeeze rolls. The transparentized paper possessed a transparency index of 50%.

In the examples, the % transparency is equal to 100 units less the "contrast ratio" as measured by a General Electric Spectrophotometer. The "contrast ratio" may be defined as the ratio of the Spectrophotometer reflectance at 550 millimicrons using a black background to the Spectrophotometer reflectance at 550 millimicrons using a white background. The lower the "contrast ratio," the higher the transparency.

The glycol esters of hydrogenated rosin which may be utilized in this invention, in addition to triethylene glycol and hexaethylene glycol, include such as ethylene glycol, propylene glycol, diethylene glycol, trimethylene glycol, tetraethylene glycol, pentaethylene glycol, heptaethylene glycol, octaethylene glycol, nonaethylene glycol, decaethylene glycol, etc. However, it may be found desirable to modify these liquid glycol esters of hydrogenated rosin with hard brittle esters of hydrogenated rosin such as the glyceryl ester, the pentaerythritol ester, and the sorbital ester of hydrogenated rosin and the like.

The glycol esters of hydrogenated rosin which are employed may be made in any known manner whereby the rosin nucleus thereof has its double bonds saturated with hydrogen, for example, by hydrogenating a glycol ester of ordinary rosin in such manner as to partially or completely saturate the double bonds of the rosin nucleus, or by esterifying a glycol with previously hydrogenated rosin, the product of either process having virtually identical properties.

Where it is desired to prepare the glycol esters by hydrogenation of the previously prepared ester of rosin, this may be accomplished by treating the ester in molten form or in solution in a volatile organic solvent with hydrogen in the presence of a hydrogenation catalyst such as the noble metal catalysts as platinum, iridium, ruthenium, platinum, osmium, etc.; the base metal catalyst as nickel, nickel-aluminum, nickel-silicon, etc.; also the copper chromate type catalyst. The hydrogenated rosin ester may be saturated from about 25 to 100% of the theoretical saturation. A preferred product is one having about 55% to about 75% of theoretical saturation.

If it is preferred to prepare the glycol esters by esterification of hydrogenated rosin, this may be accomplished by esterifying a glycol with hydrogenated rosin by any of the various known methods. The hydrogenation of the rosin may be accomplished by treatment of the rosin in molten form or in solution in a volatile organic solvent with hydrogen in the presence of a hydrogenation catalyst. The hydrogenation catalysts indicated as suitable for hydrogenation of the glycol esters of rosin are equally operable for the hydrogenation of the rosin. The hydrogenated rosin may be saturated from about 25 to 100% of the theoretical saturation. A preferred product is one having about 55% to about 75% of the theoretical saturation.

In the practice of this invention, paper may be transparentized by the impregnation of paper stock with the glycol ester of hydrogenated rosin in a solvent solution, as a hot melt, or as an aqueous dispersion. If it is desired to transparentize paper by the use of solutions of the esters of hydrogenated rosin solvents such as benzene, carbon tetrachloride, ethyl acetate, acetone and the like may be used. When paper is transparentized by the use of a solvent solution of hydrogenated rosin esters, the concentration will depend upon the type paper which is to be transparentized but in general, solutions containing about 15 to about 50% of hydrogenated rosin ester will be found satisfactory. If desired, however, other concentrations may be used.

The impregnation of the paper with the solvent solution of a glycol ester of hydrogenated rosin may be carried out in any equipment where means are provided for immersing the paper in the resin solution and removal of the excess solvent with squeeze rolls for evaporating the solvent. However, any other type equipment suitable for impregnating the paper with a solvent solution of hydrogenated rosin ester may be used.

The impregnation of the paper may be carried out with the glycol ester of hydrogenated rosin ester in a molten state by passing the paper through the molten ester with subsequent removal of excess resin.

Paper may also be impregnated by means of an aqueous emulsion of a glycol ester of hydrogenated rosin ester. It has been found that liquid rosin ester may be easily emulsified with water using emulsifying agents such as triethanol amine oleate, Duponol ME, (sodium lauryl sulfate), potassium oleate, ammonium caseinate and the like. However, paper, when transparentized by immersion in an aqueous dispersion of the hydrogenated rosin ester must be dried at elevated temperature to induce coalescence of the resin which is deposited in a discontinuous film and also to induce impregnation of the fiber by reducing the viscosity of the ester.

Paper transparentized by the process of this invention is characterized by excellent transparency, little tendency for the resin to migrate from the fiber to the surface of the paper, good pencil and ink receptivity, good pencil erasive qualities, non-yellowing on aging, stability of properties of stiffness due to resistance to oxidation and lack of odor. There thus has been provided by the process of this invention the improved transperentized paper in which superior qualities of transparency have been attained and in which the disadvantages well known to the art have been eliminated.

What I claim and desire to protect by Letters Patent is:

A method of transparentizing normally substantially opaque, unpigmented, fibrous, porous paper, which consists in impregnating said paper with a composition consisting of a 37.5% solution of a triethylene glycol ester of hydrogenated rosin in ethyl acetate, removing excess solution and drying the impregnated paper.

JULIUS G. LITTLE.